Figure 1:
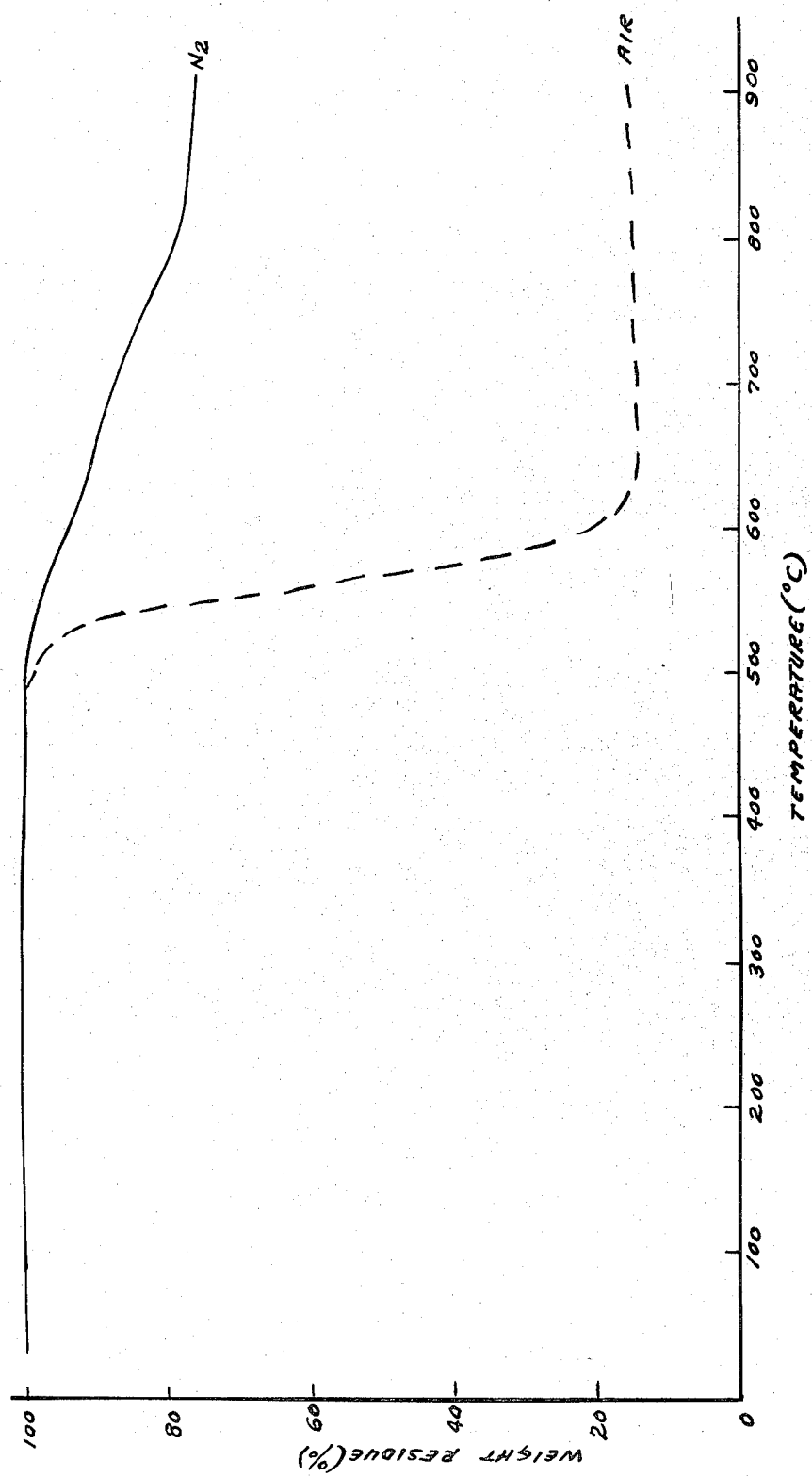

United States Patent [19]

Arnold et al.

[11] 3,925,311

[45] Dec. 9, 1975

[54] THERMALLY STABLE ARYLOXYBENZIMIDAZOBENZOPHENAN-THROLINE COMPOSITIONS

[75] Inventors: Fred E. Arnold, Centerville, Ohio; John G. Breland; Frank W. Villaescusa, both of Colorado Springs, Colo.

[73] Assignee: The United States of America as represented by the Secretary of the Air Force, Washington, D.C.

[22] Filed: May 30, 1974

[21] Appl. No.: 474,562

[52] U.S. Cl..... 260/47 CP; 117/161 P; 260/30.8 R; 260/30.8 DS; 260/32.6 N; 260/33.4 P; 260/49; 260/50; 260/65; 260/78 TF; 260/578; 260/645
[51] Int. Cl.² ........................................ C08G 73/20
[58] Field of Search........ 260/47 CP, 49, 50, 78 TF, 260/65

[56] References Cited
UNITED STATES PATENTS

| | | | |
|---|---|---|---|
| 3,414,543 | 12/1968 | Paufler | 260/47 |
| 3,681,284 | 8/1972 | Grundschober et al. | 260/47 |
| 3,740,410 | 6/1973 | Gerber | 260/295 |
| 3,743,624 | 7/1973 | Arnold et al. | 260/47 |
| 3,792,024 | 2/1974 | Saferstein | 260/78 |
| 3,798,201 | 3/1974 | Saferstein et al. | 260/78 |

*Primary Examiner*—Lester L. Lee
*Attorney, Agent, or Firm*—Joseph E. Rusz; Cedric H. Kuhn

[57] ABSTRACT

Thermally stable aryloxybenzimidazobenzophenanthroline polymer compositions are synthesized by the condensation of a tetraamino bisaryloxy compound with an aromatic tetracarboxylic acid or dianhydride thereof. The high thermal stability of the polymers and their solubility in a variety of organic solvents render them especially suitable for use in high temperature applications such as in fabrication of plastic composites and protective coatings.

6 Claims, 2 Drawing Figures

THERMALLY STABLE ARYLOXYBENZIMIDAZOBENZOPHENANTHROLINE COMPOSITIONS

RIGHTS OF THE GOVERNMENT

The invention described herein may be manufactured and used by or for the Government of the United States for all governmental purposes without the payment of any royalty.

FIELD OF THE INVENTION

This invention relates to polymeric material which possesses a high degree of thermal stability. In one aspect it relates to a process for synthesizing the polymeric materials.

BACKGROUND OF THE INVENTION

In recent years a great deal of research has been directed toward the synthesis of polymeric materials having high temperature properties, i.e., the ability to retain their physical and chemical characteristics as well as their dimensional stability at elevated temperatures of the order of 500°C and above. The demand for such materials has to a large extent been accelerated because of their usefulness in aerospace applications such as in the fabrication of nose cones and heat shields for space vehicles, rocket engine components, and the like. Because of their thermal stability, the aromatic, heterocyclic polymers have been found to be particularly useful in aerospace applications. Unfortunately, the fused and highly aromatic nature of these ring systems, which give them their exceptional stability, tends to render them intractable.

It is an object of the present invention, therefore, to provide improved thermally stable, aromatic, heterocyclic polymers.

Another object of the invention is to provide thermally stable polymeric materials which are soluble in common aprotic solvents.

A further object of the invention is to provide a process for synthesizing the polymeric materials of high thermal stability.

Figure 2:
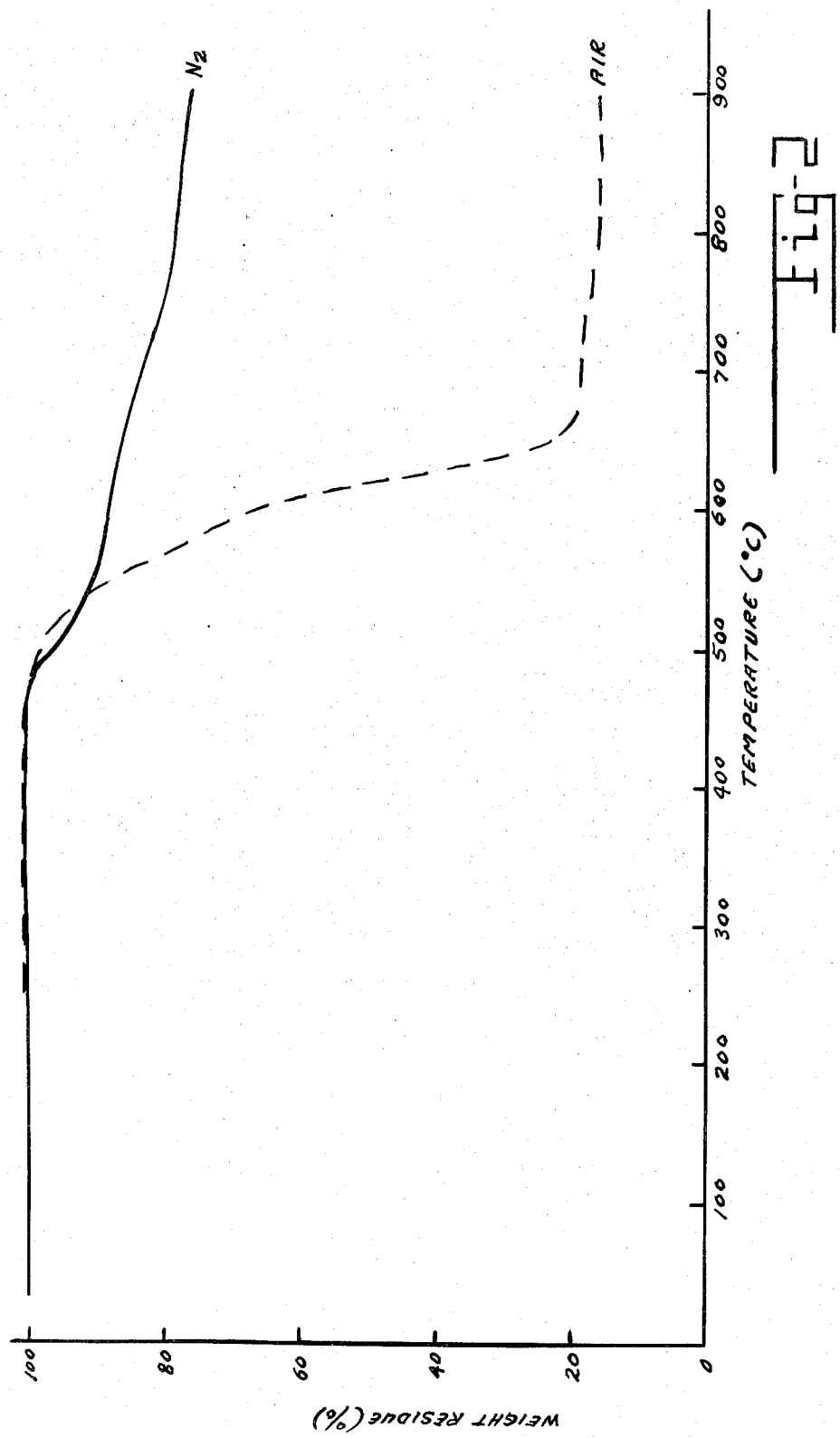

Other objects and advantages of the invention will become apparent to those skilled in the art upon consideration of the ensuing disclosure and FIGS. 1 and 2 of the drawing that show graphs of data demonstrating the thermal stability of the polymer compositions.

SUMMARY OF THE INVENTION

This invention resides in a thermally stable polymer which consists essentially of repeating units having the following formula:

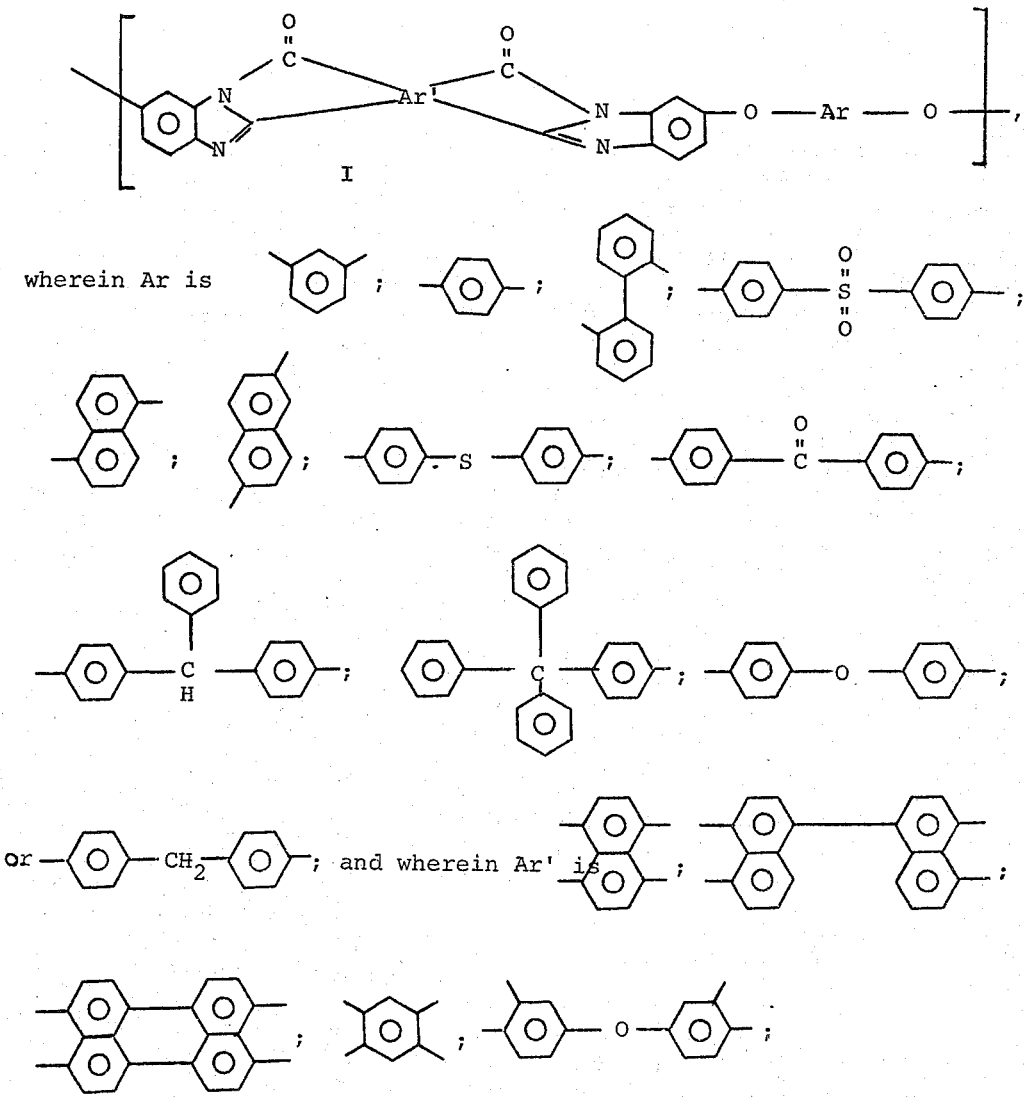

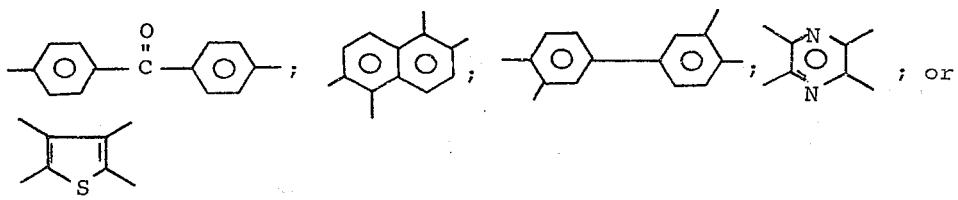

There are generally at least 2 and preferably at least 4 of the recurring units in the polymer. In general, the number of recurring units is such that the polymer has an intrinsic viscosity $[n]$ of about 0.30 to 1.0 as determined in methane sulfonic acid.

In one embodiment, the present invention resides in a process for preparing the aryloxybenzimidazobenzophenanthroline polymers. Thus, the polymers are synthesized by the condensation of a tetraamino bisaryloxy compound with an aromatic tetracarboxylic acid or a corresponding dianhydride. The condensation reaction involved is illustrated by the following equation:

tion, a considerable excess results in the production of lower molecular weight products.

Examples of aromatic tetracarboxylic acids (Formula III) which can be used include 1,4,5,8-naphthalenetetracarboxylic acid; 4,4'-dinaphthalic acid; 3,4,9,10-perylene tetracarboxylic acid; pyromellitic acid; 3,4,3',4'-diphenyloxidetetraacid; 3,4,3',4'-benzophenonetetracarboxylic acid; 1,2,5,6-naphthalenetetracarboxylic acid; 2,2',3,3'-diphenyltetracarboxylic acid; pyrazine-2,3,5,6-tetracarboxlic acid; thiophene-2,3,4,5-tetracarboxylic acid; and the like. The corresponding dianhydrides of the aforementioned carbox-

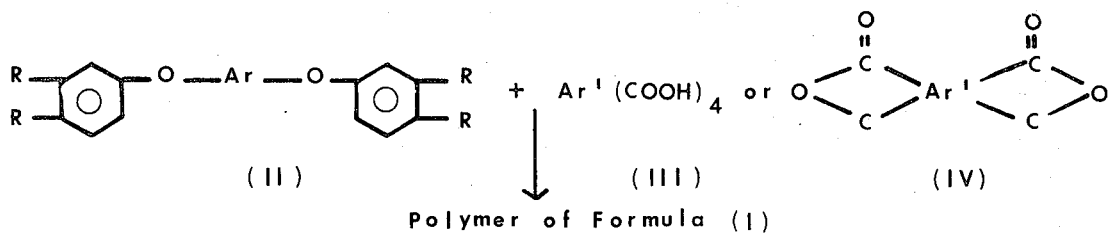

In the above equation, Ar and Ar' are as indicated hereinabove and R is $NH_2$ or $NH_3Cl$.

The condensation reaction shown by the above equation is conducted under an inert atmosphere in polyphosphoric acid or in a fused inorganic salt, such as antimony trichloride or bismuth trichloride. When utilizing polyphosphoric acid as the reaction medium, the condensation reaction is usually carried out at a temperature ranging from about 100° to 250°C for a period of about 5 to 20 hours. The reaction is generally conducted at a temperature ranging from about 60° to 180°C for a period of about 5 to 20 hours when employing a fused salt as the reaction medium. While high molecular weight weight polymers are obtained when using either type of solvent, it is often preferred to conduct the reaction in a fused salt, utilizing a dianhydride as one of the reactants. This is because the fused salts are not polymeric as is polyphosphoric acid, thereby obviating any difficulty in stirring the reaction medium and concomitantly permitting higher concentrations of reactants. Furthermore, the dianhydrides have a longer shelf-life and can be obtained in a higher purity than the tetraacids. However, when a tetraamino hydrochloride is used as one of the reactants, i.e., a compound of Formula II in which R is $NH_3Cl$, polyphosphoric acid must be used as the reaction medium. This is necessary in order that the amino hydrochloride groups may be converted to reactive amino groups by evolution of hydrogen chloride.

Any suitable inert gas can be used in the practice of the process. Examples of such gases include nitrogen, helium, argon, and the like.

In preparing the polymers of this invention as described above, the monomers are usually employed in equimolar amounts. While a slight excess of one of the monomers is not detrimental to the condensation reacylic acids are examples of compounds of Formula IV that can be used. It is often preferred to employ the dianhydrides, particularly 1,4,5,8-naphthalenetetracarboxylic acid dianhydride and 4,4'-dinaphthalic acid dianhydride. The aromatic tetracarboxylic acids and their corresponding dianhydrides are well known compounds which are described in the literature.

The tetraamino bisaryloxy compounds of Formula II, used as monomers in synthesizing the polymers of this invention, are new compositions of matter. Examples of these compounds include 1,3-bis(3,4-diaminophenoxy)benzene; 1,5-bis(3,4-diaminophenoxy)naphthalene; 2,2'-bis(3,4-diaminophenoxy)biphenyl; 4,4'-bis(3,4-diaminophenoxy)diphenyl sulfone; 4,4'-bis(3,4-diaminophenoxy)sulfide; 4,4'-bis(3,4-diaminophenoxy)ether; 4,4'-bis(3,4-diaminophenoxy)methane; and the like. In the exemplary compounds corresponding to Formula II, the R radicals are $NH_2$. However, the corresponding tetraamino hydrochlorides, i.e., R of Formula II is $NH_3Cl$, can also be employed as mentioned hereinabove.

As seen from Formula II, the compounds corresponding thereto contain aromatic ether linkages. When the compounds undergo a condensation reaction with an aromatic tetracarboxylic acid or a dianhydride thereof, the ether linkages impart several sites for bond rotation within the polymer chains, thus improving solubility parameters. Thus, the polymers are soluble in common aprotic solvents such as m-cresol, m-methoxyphenol, dimethyl sulfoxide, dimethyl formamide, and the like. On the other hand conventional aromatic, heterocyclic polymers are generally soluble only in concentrated sulfuric acid. As a result the polymers are rendered more processable, thereby alleviating the problem of intractability of conventional aromatic, heterocyclic polymers.

The tetraamino bisaryloxy compounds are synthesized by what can be termed a two step procedure. In the first step, tetranitro aryl ether compounds are prepared by aromatic nucleophilic substitution of various aryl diols with 4-fluoro-1,2-dinitrobenzene. The reaction involved is illustrated by the following equation:

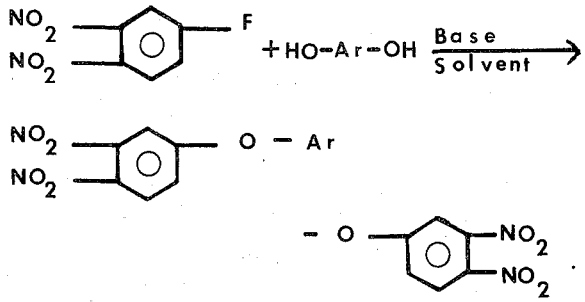

In this equation Ar is as indicated hereinabove. After recovery and purification of the tetranitro aryl ether compound, it is converted in the second step to the tetraamino bisaryloxy compound. This is accomplished by reduction of the tetranitro aryl ether compound with hydrazine or hydrazine hydrate in the presence of a catalyst consisting essentially of palladium, platinum or Raney nickel on a charcoal support. The reaction that occurs is illustrated by the following equation:

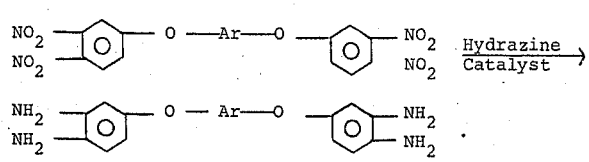

In the above equation, Ar is as indicated hereinabove. When it is desired to obtain a tetraamino hydrochloride ($NH_3Cl$) as the product, the tetraamino compound is contacted with concentrated hydrochloric acid. Because the tetraamino hydrochlorides are often more stable than the tetraamines, it is frequently preferred to use the former compounds in the process of this invention. In our copending application Ser. No. (Inv. No. 9838), there is a detailed discussion of the preparation of the tetraamino bisaryloxy compounds. The disclosure of this copending application is incorporated herein by reference.

In isolating the polymer product, the reaction mixture is cooled, e.g., to room temperature, at the end of the reaction period. The reaction mixture is then poured into a non-solvent for the polymer, such as an alcohol, a weak acid or water, thereby causing the polymer to precipitate from solution. After recovery of the polymer, as by filtration or decantation, it is washed, e.g., with an alcohol, a weak acid or a mixture thereof, and then dried under a vacuum at a temperature ranging from about 70° to 100°C.

A more complete understanding of the invention can be obtained by referring to the following illustrative examples which are not intended, however, to be unduly limitative of the invention.

EXAMPLE I

Poly[6,9-dihydro-6,9-dioxobisbenzimidazo[2,1-b:1',-2'-J]benzo[1μν]-[3,8]phenanthroline-3,12-diyl)oxy--m--phenyleneoxy]

A mixture of 0.9904 g (3.25 mmoles) of 1,4,5,8-naphthalenetetracarboxylic acid and 1,524 g (3.25 mmoles) of 1,3-bis(3,4-diaminophenoxy)benzene hydrochloride was added to 100 ml of deoxygenated polyphosphoric acid at room temperature. The mixture was heated under a nitrogen atmosphere to 75°C and maintained thereat for a period of 8 hours. The temperature was then gradually increased to 185°C and maintained thereat for 10 hours. The product was obtained by pouring the cooled reaction mixture into one liter of well stirred methanol. After separating the precipitated product by filtration, the product was thoroughly washed with boiling methanol and dried at 80°C under reduced pressure for 24 hours to give 1.59 g (95%) of reddish brown polymer. The polymer product had an intrinsic viscosity [$n$] of 0.8 as determined in methane sulfonic acid. Analysis - Calc'd for $(C_{32}H_{14}N_4O_4)_n$ (percent): C, 74.13; H, 2.72; N, 10.80

Found (percent): C, 73.73; H, 2.50; N, 10.30

EXAMPLE II

Poly[6,9-dihydro-6,9-dioxobisbenzimidazo[2,1-b:1',-2''-J-)benzo[1mn]-[3,8]phenanthroline-3,12-diyl)oxo-1,5-naphthaleneoxy]

A mixture of 0.4289 g (1.59 mmoles) 1,4,5,8-naphthalenetetracarboxylic acid dianhydride and 0.9957 g (1.59 mmoles) of 1,5-bis(3,4-diaminophenoxy)naphthalene was added to 75 g of antimony trichloride. The mixture was slowly heated to 70°C, under a nitrogen atmosphere, whereupon the antimony trichloride melted and the reaction mixture became homogeneous. The reaction temperature was increased to 160°C and maintained at that temperature for 6 hours. Acetic acid was added to the cooled reaction mixture, thereby precipitating the product as a fine brown solid. After separating the product by filtration, it was washed with boiling acetic acid, methylene chloride, and methanol. The polymer, 0.9 g (100%), had an intrinsic viscosity of 0.4 as determined in methane sulfonic acid. Analysis - Calc'd for $(C_{36}H_{16}N_4O_5)_n$ (percent): C, 76.05; H, 2.83; N, 9.86

Found (percent): C, 75.43; H, 2.46; N, 9.25.

EXAMPLE III

Preparation of Poly [6,9-dihydro-6,9-dioxobisbenzimidazo[2,1-b:1',-2'-J]benzo[1mn][3,8]phenanthroline-3,12-diyl)oxy-1,1'-biphenyl-oxy]

A mixture of 0.960 g (1.27 mmoles) of 2,2'-bis(3,4-diaminophenoxy)biphenyl and 0.343 g (1.27 mmoles) of 1,4,5,8-naphthalene-carboxylic acid dianhydride was added to 100 ml of deoxygenated polyphosphoric acid at room temperature. The mixture was slowly heated (8°C/min) under nitrogen to 195°C and maintained at that temperature for 10 hours. The product was obtained by pouring the cooled reaction mixture into one liter of well stirred methanol. After isolating the product by filtration, it was thoroughly washed with anhydrous methanol and dried at 80°C under reduced pressure to give 0.75 g (100%) of reddish brown polymer. The polymer had an intrinsic viscosity of 0.41 as determined in methane sulfonic acid. Analysis - Calc'd for $(C_{38}H_{18}O_4N_4)_n$ (percent): C, 76.76; H, 3.05; N, 9.42

Found (percent): C, 79.43; H, 2.58; N, 8.91

EXAMPLE IV

Preparation of Poly[6,9-dihydro-6,9-dioxobisbenzimidazo[2,1-B: 1,2'-J]benzo(1 mn] [2, 8] phenanthroline-3,12-diyl)oxy-4,4'-diphenyl-sulfide-oxyl]

4,4'-Di(3,4-diaminophenoxy)diphenyl sulfone (0.93 g, 2.08 mmoles) and 1,4,5,8-naphthalenetetracarboxylic acid dianhydride (0.5585 g, 2.08 mmoles) were added to 100 ml of deoxygenated polyphosphoric acid. The mixture was slowly heated (8°C/min), under nitrogen, to 195°C and maintained at this temperature for 10 hours. The reaction mixture was cooled to room temperature and poured into 2 liters of water, thereby precipitating the product. After separating the product by filtration, it was thoroughly washed with water and dried at 80°C under reduced pressure for 12 hours to give 1.28 g (94%) of a brown polymer. The polymer had an intrinsic viscosity of 0.56 as determined in methane sulfonic acid. Analysis - Calc'd for $(C_{38}H_{18}O_6N_4S)_n$ (percent): C, 69.29; H, 2.75; N, 8.50

Found (percent): C, 67.50; H, 2.25; N, 8.01

EXAMPLE V

Preparation of Poly(7,7'-dioxo[4,4'-bi-7H-benzimidazo[2,1-a]benzo-[de]isoquinoline]-10,10'-diyl)oxy-1,5-naphthalene-oxy]

A mixture of 0.3032 g (0.814 mmole) of 1,5-bis(3,4-diaminophenoxy)naphthalene and 0.3210 g (0.814 mmole) of 4,4'-dinaphthalic acid dianhydride was added to 100 ml of deoxygenated polyphosphoric acid at room temperature. The mixture was slowly heated (8°C/min) to 195°C and maintained at that temperature for 10 hours. The cooled reaction mixture was poured into one liter of well stirred water, thereby precipitating the polymer. After separating the polymer by filtration, it was thoroughly washed with water and then with anhydrous methanol. The washed product was then dried at 80°C under reduced pressure for 12 hours to give 0.56 g (100%) of a brown polymer. The polymer had an intrinsic viscosity of 0.35 as determined in methane sulfonic acid. Analysis - Calc'd for $(C_{46}H_{22}N_4O_4)_n$ (percent): C.79.52; H,3.19; N,8.06

Found (percent): C,77.38; H,2.85; N,7.38

EXAMPLE VI

Preparation of Poly[°7,7'-dioxo[4,4'-bi-7H-benzimidazo [2, 1-a] benzo-[de]isoquinoline]-10, 10'-diyl)oxy-1,3-phenyleneoxy]

A mixture of 1.0 g (2.13 mmoles) of 1,3-bis(3,4-diaminophenoxy)-benzene hydrochloride and 0.842 g (2.13 mmoles) of 4,4'-dinaphthalic acid dianhydride was added to 100 ml of deoxygenated polyphosphoric acid at room temperature. The mixture was heated, under nitrogen, to 75°C and maintained at that temperature for 8 hours. The temperature was then gradually heated to 195°C and maintained at that temperature for 10 hours. The cooled reaction mixture was poured into one liter of well stirred water, thereby precipitating the product. After separating the product by filtration, it was thoroughly washed with methanol. The washed product was dried at 80°C under reduced pressure for 24 hours to give 1.37 g (100%) of reddish brown polymer. The polymer has an intrinsic viscosity of 0.62 as determined in methane sulfonic acid. Analysis - Calc'd for $(C_{42}H_{20}N_4O_4)_n$ (percent): C,78.25; H,3.12; N,8.69

Found (percent): C,75.85; H,2.82; N,7.83

EXAMPLE VII

Preparation of Poly [7,7'-dioxo[4,4'-bi-7H-benzimidazo [2, 1-albenzo-[de]isoquinoline]-10,10'-diyl)oxy-1,1'-biphenyl-oxy]

A mixture of 0.2884 g (0.723 mmole) of 2,2'-bis(3,4-diaminophenoxy)biphenyl and 0.2854 g (0.723 mmole) of 4,4'-dinaphthalic dianhydride was added to 100 ml of deoxygenated polyphosphoric acid at room temperature. The mixture was slowly heated (8°C/min) under nitrogen to 195°C and maintained at that temperature for 10 hours. The cooled reaction mixture was poured into one liter of well stirred water, thereby precipitating the product. After separation of the product by filtration, it was washed first with water and then methanol. The washed product was dried at 80°C under reduced pressure for 12 hours to give 0.5 g (96%) of reddish brown polymer. The polymer had an intrinsic viscosity of 0.43 as determined in methane sulfonic acid.

Analysis - Calc'd for $(C_{48}H_{24}N_4O_4)_n$ (percent): C,79.98, H,3.35; N,7.77

Found (percent): C,77.86; H,3.78; N,6.95

The polymers of Examples I and III were subjected to thermogravimetric analysis, and the data obtained are shown graphically in FIGS. 1 and 2, respectively. As seen from FIG. 1, the polymer of Example I underwent a weight loss of 10 percent at 650°C in nitrogen and 540°C in air. From FIG. 2, it is seen that the polymer of Example III lost 10 percent of its weight at 550°C in both air and nitrogen.

As mentioned hereinbefore, the polymers of this invention are soluble in an aprotic solvent, such as m-cresol. Furthermore, thermogravimetric analysis of the polymers shows that they are thermally stable at elevated temperatures. These desirable properties render them particularly useful for high temperature applications and facilitate the fabrication of composites and the preparation of protective coatings.

As will be evident to those skilled in the art, modifications of the present invention can be made in view of the foregoing disclosure. Such modifications fall within the spirit and scope of the invention.

We claim:

1. A thermally stable polymer consisting essentially of repeating units having the following formula:

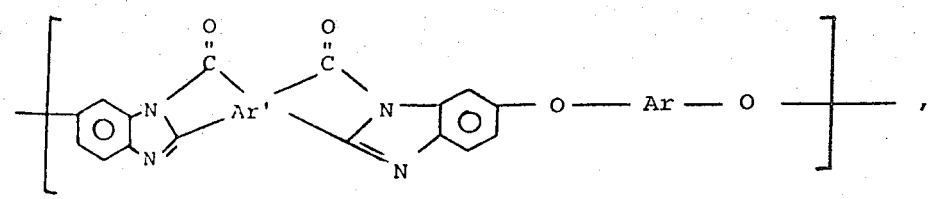

wherein Ar is 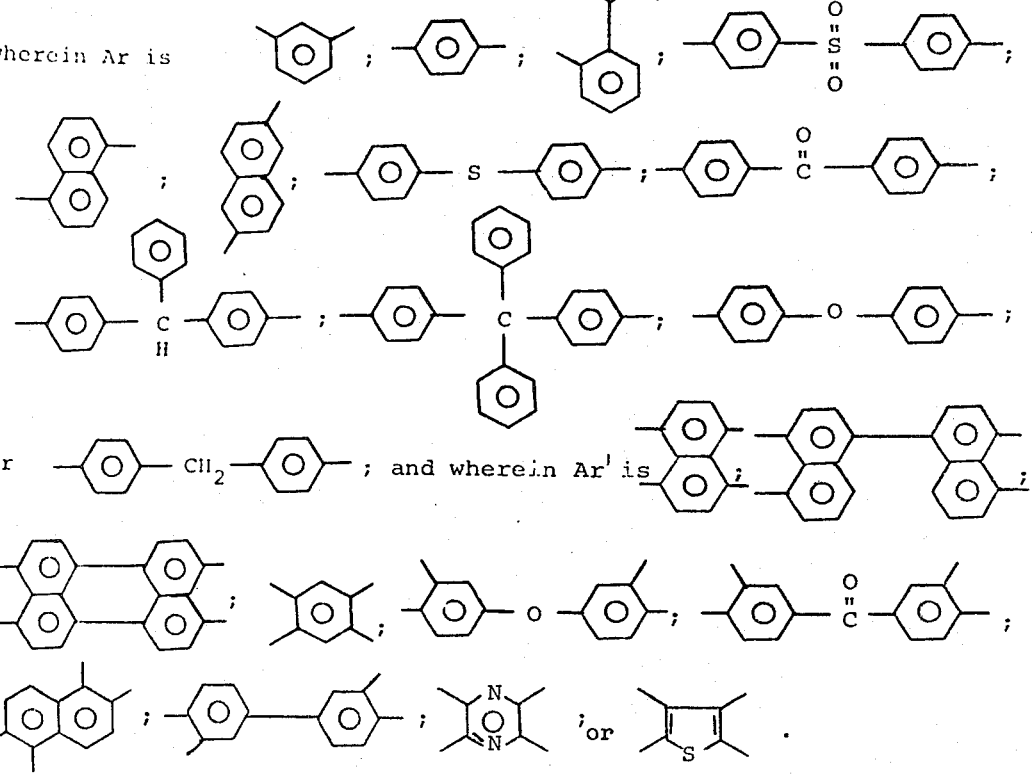
2. The polymer of claim 1 in which Ar is
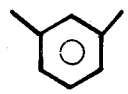
and Ar' is
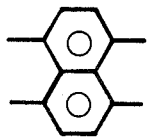
3. The polymer of claim 1 in which Ar is
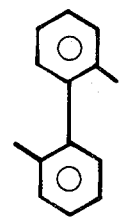
and Ar' is
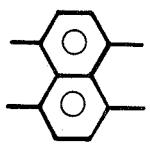
4. The polymer of claim 1 in which Ar is
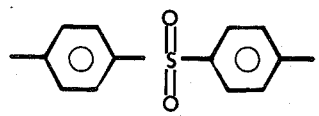
and Ar' is
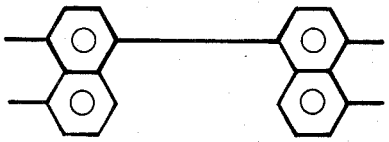
5. The polymer of claim 1 in which Ar is
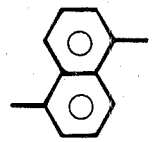
and Ar' is
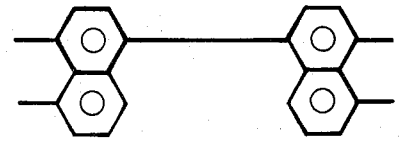
6. The polymer of claim 1 in which Ar is
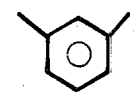
and Ar' is
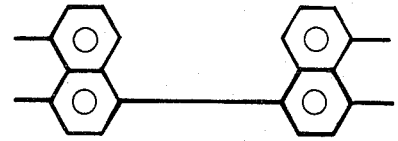
* * * * *